May 13, 1958 — I. ERLICHMAN — 2,834,272
PHOTOGRAPHIC PRODUCT
Filed Oct. 3, 1955 — 2 Sheets-Sheet 2
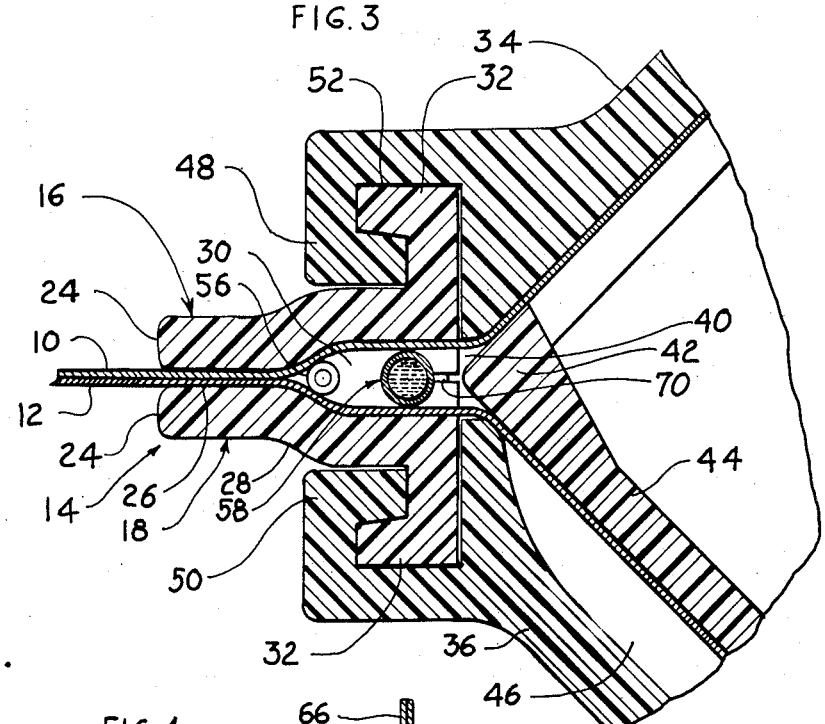
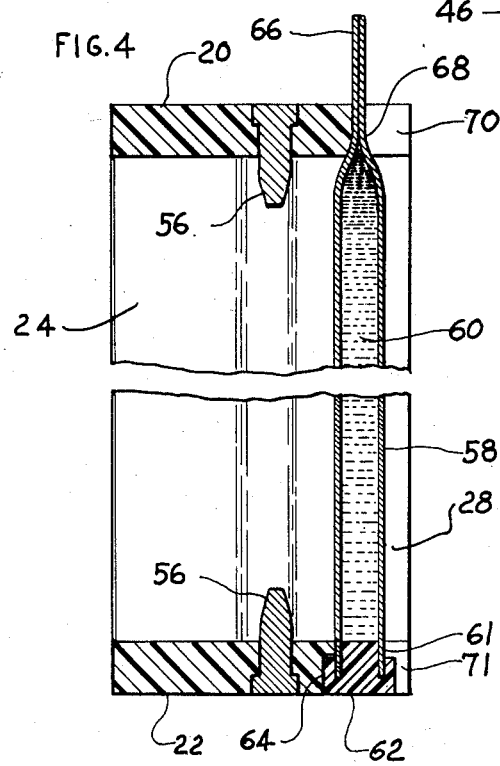
INVENTOR.
Irving Erlichman
BY Brown and Mikulka
and Robert E. Corb
Attorneys ns # United States Patent Office 2,834,272
Patented May 13, 1958

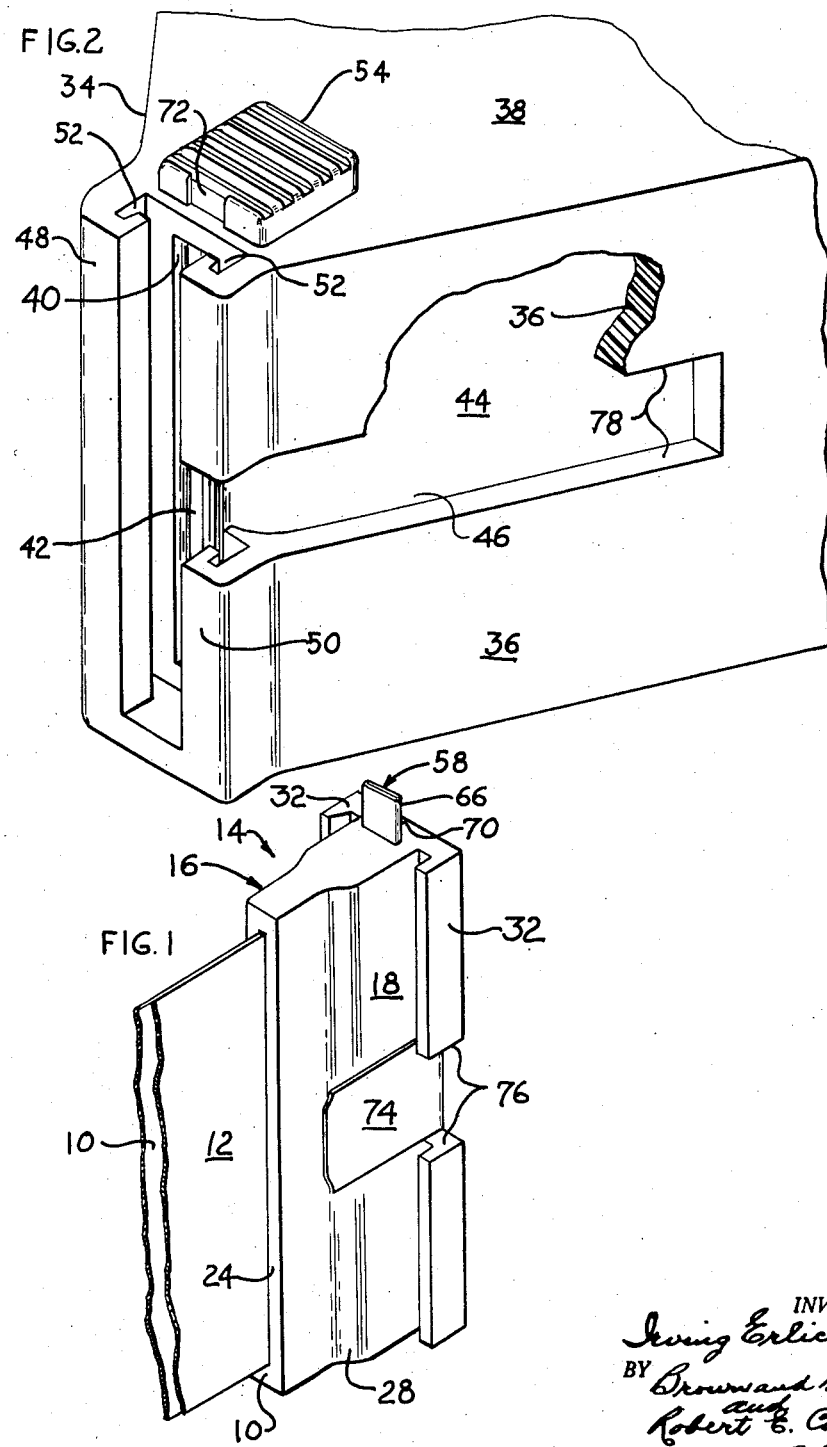

2,834,272

PHOTOGRAPHIC PRODUCT

Irving Erlichman, Natick, Mass., assignor to Polaroid Corporation, Cambridge, Mass., a corporation of Delaware Application October 3, 1955, Serial No. 538,043

20 Claims. (Cl. 95—67)

This invention relates to photographic film units including novel devices for performing a plurality of operations thereon, and particularly to improvements in the invention of Edwin H. Land covered in copending application Serial No. 538,152, filed October 3, 1955.

Photographic film units have been proposed comprising a photosensitive sheet and a second sheet secured together in superposed relation. The two sheets are preferably opaque to actinic light to prevent premature exposure of the photosensitive sheet and are adapted to be introduced into a camera wherein they are stripped apart and the photosensitive sheet is exposed. The photosensitive sheet includes an area adapted to be exposed and the two sheets are secured together preferably around the margins of this area. The sheets are stripped apart during their introduction into apparatus such as a camera, through a passage provided in the housing of said apparatus, preferably by moving the sheets, commencing at their leading ends, against a member which extends between the sheets for stripping them apart and guiding them along separate paths. This type of film unit construction finds particular application in self-processing film units wherein a processing liquid is distributed in a layer between the photosensitive and second sheets during withdrawal of the film unit from a camera and is effective, for example, to produce a positive photographic print in the second sheet. The processing liquid is supplied in a container, preferably associated with the film unit, and is spread in a layer between the photosensitive and second sheets to form a sandwich by movement of the sheets in superposed position between a pair of pressure-applying members. The processing liquid holds the two sheets in superposed relation, thereby making it possible for the film unit to remain in the presence of light during a predetermined processing period, at the end of which the two sheets may be stripped apart.

A self-processing film unit of the above type is usually employed by introducing it into a camera through a passage in the camera housing and, following the exposure of the photosensitive sheet, withdrawing the film unit from the camera through the same passage. During the introduction of the film unit through a passage into the camera, the film unit must be engaged in such a manner as to prevent the admission of light through the passage into the camera. This and additional operations are usually performed on the film unit by elements of the camera and include the separation of the photosensitive and second sheets during introduction into the camera, the distribution between the sheets of a quantity of processing liquid from a container and, during withdrawal of the film unit from the camera, the superpositioning of the sheets and the spreading of the processing liquid in a thin layer therebetween.

An object of the invention is to provide a photographic film unit comprising a pair of sheets secured in superposed relation and adapted to be introduced into a camera in a separated condition, and an improved device secured around the leading end sections of said sheets, said device including means defining a passage within which the leading end sections of the sheets are secured in a separated condition and through which said sheets are movable, means for coupling said device with a camera, and means for separating said sheets from one another during movement through said passage into a camera with which said device is coupled.

Other objects of the invention are: to provide a device of the above type including a passage having a substantially narrow section and a relatively wide section within which the leading end sections of a film unit are maintained in a separated condition and through which said sheets may move along separate paths, and a pair of novel separating members located within said wide section adjacent said narrow section of said passage for maintaining said leading end sections of said sheets in a separated condition and for separating said sheets from one another during movement thereof through said passage; to provide a device of the above type including side and end walls defining said passage and wherein said end walls mount said separating members and said container, said side walls frictionally engage and retain the leading end sections of said sheets between said separating members and/or said container and said end walls are provided with slits permitting the spacing apart of said side walls to permit the movement of said film unit through said passage, and said side walls include means for coupling said device with a camera and spacing said side walls apart; and to provide a device of the above type wherein said end walls are so constructed as to permit said container to be withdrawn in the direction of its elongation from said passage and to sequentially compress sections of said container to effect the distribution of its contents in an elongated mass extending across the sheets.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a perspective view of a photographic film unit embodying the present invention;

Fig. 2 is a fragmentary perspective view of a camera with which said film unit is adapted to be employed;

Fig. 3 is a sectional view taken along a plane intermediate the ends of a component of the film unit of Fig. 1 and showing said film unit operatively associated with said camera; and Fig. 4 is a sectional view of the film of Fig. 3 taken along a line substantially midway between its sides.

Generally the film unit of the present invention comprises a photosensitive sheet, a second sheet secured in superposition with the photosensitive sheet and a device preferably secured around said sheets adjacent one end thereof and providing a passage through which said sheets are movable, said device preferably mounting a container of a photographic liquid between the photosensitive and second sheets for movement with respect to the sheets, or at least being so constructed as to permit the introduction of a quantity of photographic liquid between the sheets. The aforementioned device may be adapted to the performance of a number of other operations involved in the employment of the film unit and including, for example, retaining the two sheets with their leading ends initially separated, light-sealing the passage through which the sheets are introduced into a camera, stripping the sheets apart and guiding them along separate paths during introduction into a camera, distributing a processing liquid between the two sheets, and superposing the sheets and spreading the processing liquid in a layer therebetween during withdrawal of the sheets from the camera.

The photosensitive and second sheets and the photographic liquid may be so constituted as to effect a variety of photographic processes and are preferably adapted to the production of a photographic print in the second sheet by one of the transfer processes now well known in the art. In one type of film unit, for example, the photosensitive sheet includes an emulsion of silver halide in which a latent image can be attained by differential exposure to actinic light, the second sheet includes an image-receptive layer containing silver precipitating nuclei, and the photographic liquid spread in a layer between the emulsion and image-receptive layer includes a developer, a silver halide solvent and an alkali. In the presence of this layer of liquid a latent image in the photosensitive layer is reduced to silver and a soluble silver complex, formed with the silver of unreduced silver halide, is transferred by imbibition to the image-receptive layer of the second sheet and there is reduced to silver to produce a positive image. Photographic materials generally useful in processes of this type are described in detail in Patents Nos. 2,543,181, issued February 27, 1951, and 2,698,237 and 2,698,245, both issued December 28, 1954, all in the name of Edwin H. Land.

A camera of the type with which the herein disclosed film unit and device are adapted to be employed is described in the copending application of Edwin H. Land, Serial No. 537,982, filed October 3, 1955, and includes a housing having a passage through which the superposed sheets of the film unit may be moved into position for exposure. The camera includes, in addition to means for separating the sheets during movement into the camera, guide means for positioning the two sheets apart from one another so that the photosensitive sheet may be exposed. Following exposure of the photosensitive sheet, the two sheets are withdrawn through the passage from the camera and the sheets are superposed with a layer of processing liquid therebetween.

Reference is now made to the drawings wherein there is illustrated a photographic film unit embodying the present invention and comprising a photosensitive sheet 10 and a second sheet 12, preferably of the same width, secured together in superposed relation. Photosensitive sheet 10 comprises an opaque backing sheet including an area provided with a layer of photosensitive material in which a latent image can be attained by differential exposure to actinic light, and second sheet 12 comprises an opaque sheet having an image-receptive area at least coextensive with the photosensitive area of sheet 10 and superposed therewith, capable of supporting a visible print of a latent image in the photosensitive area. Sheets 10 and 12 are secured together in superposition at least around the margins of the photosensitive and image-receptive areas by a suitable cement or adhesive material, for example a linear polyamide which forms a substantially lighttight bond between the sheets and readily permits their being stripped apart. The photosensitive and image-receptive areas are preferably located adjacent the leading ends of the sheets, i. e., the ends first introduced into a camera, and the trailing ends of the sheets are substantially permanently secured or hinged together so as to properly register the photosensitive and image-receptive areas with one another during withdrawal of the sheets from the camera, and to form a leader which remains outside of the camera and which may be manually grasped for withdrawing the sheets therefrom.

The film unit includes a novel device generally designated at 14 and adapted to perform a number of functions involved in the provision of a film unit and its employment in connection with a camera for producing a photographic print. Device 14, in the form shown, comprises a pair of elongated side walls 16 and 18 and end walls 20 and 22 located in surrounding relation to the leading end sections of sheets 10 and 12. End walls 20 and 22 are spaced apart by a distance substantially equal to the width of sheets 10 and 12 and cooperate with side walls 16 and 18 to form a passage through which the sheets extend. Side walls 16 and 18 include portions 24 having substantially parallel adjacent surfaces defining a relatively narrow throat 26, the sides of which engage the outer surfaces of sheets 10 and 12, making throat 26 substantially lighttight. Side walls 16 and 18 include divergent sections 28 forming a chamber 30 substantially wider than throat 26 and opening in the direction of the leading ends of sheets 10 and 12. Device 14 is adapted to engage the walls of a camera housing adjacent the passage in said housing through which sheets 10 and 12 are introduced so as to form a lighttight juncture with the housing walls and thereby prevent the admission of light into the passage during the introduction and withdrawal of sheets 10 and 12. In a preferred form of film unit, provision is made for coupling device 14 to the camera in a lighttight fashion and for this purpose sections 28 of walls 16 and 18 adjacent the open end of chamber 30 are provided with laterally extending L-shaped or undercut flanges 32 adapted to be engaged in slots in the camera housing.

For purposes of illustration, a portion of a typical camera housing is illustrated and comprises walls 34 and 36 which meet at an oblique angle and a third wall 38 located in a plane substantially perpendicular to walls 34 and 36. The camera housing is provided with an elongated passage or slot 40 located at the juncture of walls 34 and 36 and through which the leading ends of sheets 10 and 12 may be introduced into the camera. To position sheets 10 and 12 apart from one another so that the photosensitive sheet can be exposed, the camera includes a pair of inner walls located adjacent walls 34 and 36 and joined at a V-shaped section 42 having an apex centrally located in passage 40. One of these walls, indicated at 44, cooperates with wall 36 to define a chamber 46 into which second sheet 12 of the film unit is advanced during introduction of the sheets into the camera. As a means for mounting device 14 on the camera housing in closing relation to passage 40, walls 34 and 36 are provided with reentrant sections 48 and 50 on opposite sides of passage 40 adapted to engage undercut flanges 32 of device 14. Reentrant sections 48 and 50 cooperate to define a slot 52, having a generally U-shaped cross section, extending through wall 38 and device 14 is coupled with the camera housing by sliding it into slot 52 in a direction generally perpendicular to wall 38 and to the direction of movement of the sheets into the camera. A means, such as a manually operable locking element 54, is provided on wall 38 for retaining device 14 in position in slot 52.

Heretofore it has been the usual practice to separate the photosensitive and second sheets of a film unit by advancing their leading end sections against the apex of a wedge-shaped member comprising an element of the camera. The wedge-shaped member is located in the passage in the camera housing and is adapted to extend between the sheets and guide them along separate paths during their introduction into the camera. While this means for separating the sheets is satisfactory, some difficulty may be experienced in effecting the initial separation of the leading ends of the sheets due in part to the flexibility of the sheets and the difficulty of light-sealing the passage in the camera and properly locating the leading ends of the sheets relative to the apex of the wedge-shaped member. These difficulties are eliminated by device 14 of the present invention which is not only movable with respect to the sheets and capable of effecting their separation during introduction into the camera, but is effective to provide the film unit with the leading ends of the sheets initially spaced apart. A means is provided located within chamber 30 of device 14 between the leading ends of the sheets for retaining them apart and for separating the sheets as they are moved through chamber 30 and, in the form shown, comprises a pair of tapered pins 56 secured in end walls 20 and 22 and projecting toward one another between the margins of the sheets. Since sheets 10 and 12 are preferably only secured together along their margins, it is important only that the pins project between the margins in order to separate the sheets as they are advanced against the pins during introduction of the sheets into a camera. By virtue of this arrangement, the two sheets are stripped apart prior to introduction into passage 40 and are advanced into the passage on opposite sides of U-shaped section 42, while device 14 also acts to effectively seal the passage against the admission of light.

The film unit of the present invention preferably includes a quantity of a photographic liquid capable of processing the film unit when spread in a layer between the photosensitive and second sheets by movement of the sheets between a pair of spreading members. The liquid is provided in a container preferably of the type adapted to be withdrawn from the film unit prior to movement of the sheets between a pair of spreading members and, during withdrawal from the film unit, to discharge its liquid contents between the sheets in condition to be spread during subsequent advancement of the sheets between the spreading members. The liquid-carrying container, designated at 58, is of the type disclosed in the copending application of Edwin H. Land, Serial No. 522,605, filed July 18, 1955, and is in the form of a tube of a material which is at least impervious to the processing liquid and closed at both ends. The tube may have any convenient cross-sectional shape such as round, oblate, elliptic, etc., and includes one end adapted to open to provide a mouth through which the liquid may be discharged. Container 58 is mounted within chamber 30 between sheets 10 and 12 and extending transversely of the sheets with its ends secured in end walls 20 and 22. Container 58 is filled with a quantity of liquid 60 and is closed at one end 61, for example, by a plug 62 secured in a hole 64 in end wall 22. The other end of container 58 is sealed by flattening the container and pinching and/or securing the walls thereof together, and the flattened end section, indicated at 66, projects through a narrow passage 68 in end wall 20 of device 14 where it may be manually grasped for withdrawing container 58 from the film unit in the direction of its elongation. Liquid 60 is preferably quite viscous, having a viscosity ranging, for example, from 100 to 200,000 centipoises at a temperature of 20° C. so that, as container 58 is withdrawn through passage 68 in the direction of end section 66, end section 61 is withdrawn from around plug 62 and successive sections of the container are progresively compressed, liquid 60 being discharged from end section 61 in an elongated mass extending across the sheets substantially from side to side thereof, for example, in the manner more fully described in the last-mentioned application.

The film unit is provided with the leading ends of sheets 10 and 12 extending through chamber 30 on opposite sides of container 58 and preferably engaged between the container and wall sections 28 to aid in retaining the sheets within device 14. The device, in the form shown, is provided with end walls 20 and 22 having slits 70 extending from their edges into, respectively, passage 68 and hole 64. The purpose of slits 70 is to permit wall sections 28 to be spread apart slightly as device 14 is introduced into passage 68 so as to allow free movement of the sheets between wall sections 28 and pins 56 and container 58. To spread sections 28 apart, either or both of reentrant sections 48 and 50 of camera housing walls 34 and 36, and undercut flanges 32 on side walls 16 and 18, are slightly divergent and coact with one another to spread walls 16 and 18 apart during movement of device 14 into operative position in U-shaped slot 52. As a means for light-sealing expanded slits 70 and end wall 20, and also passage 68 which may be slightly widened, locking element 54 is adapted to extend across the outer surfaces of end wall 20 and is provided with a shallow recess 72 capable of accommodating flattened end 66 so that portions of element 54 project on opposite sides of passage 68 in engagement with flattened end 66 of container 58. Locking element 54 may, if desired, aid in the discharge of liquid 60 from container 58 and is preferably resiliently biased in the direction of the container so as to close light-seal passage 68 as end 61 of container 58 is withdrawn therefrom. The film unit may be provided without a container of liquid located between the sheets and, in this case, device 14 is formed, for example, with an aperture in end wall 20, to permit the introduction of a liquid-carrying container between the sheets and the discharge of the liquid contents of the container between the sheets.

The elongated mass of liquid 60 is spread in a thin layer between the sheets by advancing the sheets in superposition between a pair of parallel spreading members. These members may be biased toward one another so as to apply compressive pressure to the sheets, or they may be substantially fixed with respect to one another to form a narrow pressure-generating slot or passage through which the sheets are moved for generating hydraulic pressure in the liquid between the sheets. This pressure in the liquid causes it to be spread in a thin layer between the sheets as they are moved between the spreading members. In a preferred form of device 14, sections 24 of walls 16 and 18 comprise the fixed spreading members and throat 26 the pressure-generating throat through which the superposed sheets are moved. It is desirable that sections 24 be substantially rigid and for this purpose they may be formed substantially thicker than the other sections of side walls 16 and 18 or they may be provided with reinforcing or stiffening members (not shown) formed of metal or integrally formed therewith. It may be desirable to provide spreading members on the camera adapted to engage the sheets as they are withdrawn from throat 26, or the camera may be provided with members adapted to engage sections 24 so as to rigidly hold said sections or apply pressure through said sections to the sheets. It is to be noted that the tapering of pins 56 proves to be an advantage since this arrangement allows room for the mass of liquid to pass between the pins substantially without contacting the pins and adhering thereto during withdrawal of the sheets from the camera.

The sheets comprising the film unit are adapted to be introduced into the camera by grasping them and pushing them through device 14. The friction on the sheets due to engagement with the walls of throat 26 and the resistance to advancement caused by separation of the sheets may be sufficient to cause the sheets to buckle rather than move through device 14, and accordingly it may be desirable to draw rather than push the sheets into the camera by pulling on one of the sheets. For this purpose sheet 12 is provided with a pull tab 74 and undercut flange 32 of side wall 18 is provided with a slot 76 through which tab 74 projects. Camera housing wall 36 includes an elongated slot 78 communicating with chamber 46 and extending in alignment with slot 76 through reentrant section 50 of housing wall 36. The film unit is provided with tab 74 initially disposed flat against side wall 18 of device 14 so that the device may be inserted into slot 54 into operative position, and following insertion of the device into operative position, the tab may be manually grasped and pulled for drawing sheet 12 into chamber 46 and sheet 10, secured to sheet 12, through device 14 into exposure position in the camera. Sheet 12 is unaffected by light entering slot 78 and, being opaque, serves to prevent the exposure of photosensitive sheet 10.

The herein disclosed film unit is employed by introducing device 14 into U-shaped slot 52 in a camera housing until undercut flanges 32 are coupled in operative position with reentrant sections 48 and 50, locking element 54 being moved into engagement with device 14 to lock it in operative position. Sheets 10 and 12 are then introduced through device 14 into the camera either by pushing the sheets through the device or by pulling the sheets into the camera with the aid of pull tab 74. During movement of the sheets through device 14, they are stripped apart and photosensitive sheet 10 is guided into exposure position within the camera housing. Following exposure of the photosensitive sheet, flattened end 66 of container 58 may be grasped and the container withdrawn from between the sheets through passage 68 in end wall 20, causing its liquid contents to be distributed in a mass across and between the sheets. As soon as possible thereafter, the trailing ends of the sheets projecting exteriorly of the device are grasped and the sheets withdrawn from the camera through device 14, the sheets being superposed and the processing liquid being spread in a layer therebetween to form a sandwich during movement of the sheets through throat 26. The sheets comprising the sandwich are allowed to remain in superposed relation during a predetermined processing period at the end of which the two sheets may be stripped apart. While device 14 is illustrated in its preferred form comprising a component of a film unit initially secured around the leading end sections of the sheets of the film unit, it may be provided separately and is adapted to be employed with a film unit comprising photosensitive and second sheets, for supplying a quantity of a photographic liquid between the sheets.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A photographic film unit of the self-processing type comprising a photosensitive sheet, a second sheet secured in superposition with said photosensitive sheet along the lateral margins of said sheets, said sheets being adapted to be introduced into a camera through an aperture in the housing of said camera and separated from one another during introductory movement, a quantity of photographic liquid capable of processing said film unit when distributed between said sheets carried in a container located between the leading end sections of said sheets and a device secured around said leading end sections of said sheets and adapted to be coupled with a camera, said device comprising a pair of end walls and a pair of side walls cooperating to define a passage through which said sheets are movable, said passage including a relatively narrow section at which substantially rigid parallel portions of said side walls engage said superposed sheets for preventing the admission of light through said passage and a relatively wide section wherein said side walls are spaced apart so that said leading end sections of said sheets may be maintained in separated condition with said container located therebetween, and means within said wide section of said passage and located between said lateral margins of said sheets for retaining said leading end sections of said sheets apart from one another and for separating said sheets in response to introductory movement of said sheets through said passage against said members, said rigid parallel portions of said side walls being so constructed as to superpose said sheets during withdrawal from said camera through said passage and apply compressive pressure to said superposed sheets to effect the spreading of said photographic liquid in a layer between said sheets.

2. A photographic film unit of the self-processing type comprising a photosensitive sheet, a second sheet secured in superposition with said photosensitive sheet along the lateral margins of said sheets, said sheets being adapted to be introduced into a camera through an aperture in the housing of said camera, a container carrying a quantity of photographic liquid capable of processing said film unit when distributed between said sheets located between the leading end sections of said sheets and a device secured around said leading end sections of said sheets and adapted to be coupled with a camera, said device comprising a pair of end walls and a pair of side walls cooperating to define a passage through which said sheets are movable, said passage including a relatively narrow section through which said sheets are movable in superposed relation and a relatively wide section wherein said leading end sections of said sheets are maintained in a separated condition, and a pair of tapered members mounted on said end walls and projecting within said wide section of said passage between the lateral margins of said leading end sections of said sheets and located for separating said sheets from one another in response to movement of said sheets through said passage into a camera with which said device is coupled.

3. A photographic film unit of the self-processing type comprising a photosensitive sheet, a second sheet superposed with said photosensitive sheet, said sheets being adapted to be introduced into a camera through an aperture in the housing of said camera, an elongated container carrying a quantity of photographic liquid capable of processing said film unit when distributed between said sheets and a device secured around the leading end sections of said sheets adapted to be coupled with a camera, said device comprising a pair of end walls and a pair of side walls cooperating to define a passage through which said sheets are movable, said passage including a relatively narrow section through which said sheets are movable in superposed relation and a relatively wide section wherein said leading end sections of said sheets are maintained in a separated condition, and means within said wide section of said passage and located between said sheets for retaining said leading end sections of said sheets apart from one another and for separating said sheets during movement through said passage into a camera with which said device is coupled, said container being mounted within said wide section of said passage transversely of said sheets between said leading end sections thereof, said sheets being movable along opposite sides of said container.

4. A photographic film unit of the self-processing type comprising a photosensitive sheet, a second sheet superposed with said photosensitive sheet, said sheets being adapted to be introduced into a camera through an aperture in the housing of said camera, an elongated container carrying a quantity of photographic liquid capable of processing said film unit when distributed between said sheets and a device secured around the leading end sections of said sheets adapted to be coupled with a camera, said device comprising a pair of end walls and a pair of side walls cooperating to define a passage through which said sheets are movable, said passage including a relatively narrow section through which said sheets are movable in superposed relation and a relatively wide section wherein said leading end sections of said sheets are maintained in a separated condition, means within said wide section of said passage and located between said sheets for retaining said leading end sections of said sheets apart from one another and for separating said sheets during movement through said passage into a camera with which said device is coupled, said container being mounted at its ends in said end walls so as to extend transversely of said sheets between said leading end sections thereof within said wide section of said passage, said sheets being movable through said passage along opposite sides of said container, the latter cooperating to guide said sheets along separate paths as they are separated from one another, and an aperture in one of said end walls through which said container can be withdrawn from said passage in a direction substantially perpendicular to the direction of movement of said sheets through said passage.

5. A photographic film unit as defined in claim 4 wherein said aperture in said one end wall converges to a substantially narrow slot formed therein and adapted to progressively compress successive sections of said container during withdrawal of said container through said aperture from said passage so as to cause said photographic liquid to be distributed from said container in an elongated mass between said sheets.

6. A photographic film unit of the self-processing type comprising a photosensitive sheet, a second sheet superposed with said photosensitive sheet, said sheets being adapted to be introduced into a camera through an aperture in the housing of said camera, an elongated tubular container carrying a quantity of photographic liquid capable of processing said film unit when distributed between said sheets and a device secured around the leading end sections of said sheets and adapted to be coupled with a camera, said device comprising a pair of end walls and a pair of side walls cooperating to define a passage through which said sheets are movable, said passage including a relatively narrow section through which said sheets are movable in superposed relation and a relatively wide section wherein said leading end sections of said sheets are maintained in a separated condition, and a pair of tapered pins mounted on said end walls with their axes in alignment and their tapered ends projecting between said leading end sections of said sheets, said pins being capable of separating said sheets from one another during movement thereof through said passage into a camera with which said device is coupled, said container being mounted at its ends in said side walls between said sheets adjacent said pins and with its axis located substantially parallel to and in the plane of the axes of said pins, said sheets being movable through said passage along opposite sides of said container, the latter cooperating to guide said sheets along separate paths as they are separated from one another by said pins.

7. A film unit as defined in claim 6 wherein one end of said container extends through an aperture in one of said end walls and is capable of being withdrawn axially from said passage through said aperture.

8. A photographic film unit of the self-processing type comprising a photosensitive sheet, a second sheet superposed with said photosensitive sheet, said sheets being adapted to be introduced into a camera through an aperture in the housing of said camera, an elongated container carrying a quantity of photographic liquid capable of processing said film unit when distributed between said sheets and a device secured around the leading end sections of said sheets adapted to be coupled with a camera, said device comprising a pair of end walls and a pair of side walls cooperating to define a passage through which said sheets are movable, said passage including a relatively narrow section at which portions of said side walls engage said superposed sheets so as to prevent the admission of light through said passage and a relatively wide section wherein said leading end sections of said sheets are maintained in a separated condition, means within said wide section of said passage and located between said sheets for retaining said leading end sections of said sheets apart from one another and for separating said sheets during their movement through said passage into a camera with which said device is coupled, said container being mounted at its ends in said end walls so as to extend transversely of said sheets between said leading end sections within said wide section of said passage, said sheets being movable through said passage along opposite sides of said container, the latter cooperating to guide said sheets along separate paths as they are separated from one another, an aperture in one of said end walls through which said container can be withdrawn from said passage in a direction substantially perpendicular to the direction of movement of said sheets through said passage, and means associated with said one end wall for engaging said container so as to cause said liquid to be distributed therefrom in an elongated mass between the sheets as said container is withdrawn from said passage through said aperture.

9. A photographic film unit of the self-processing type comprising a photosensitive sheet, a second sheet superposed with said photosensitive sheet, said sheets being adapted to be introduced into a camera through an aperture in the housing of said camera, a quantity of photographic liquid capable of processing said film unit when distributed between said sheets, a container comprising an elongated tube filled with said quantity of photographic liquid and a device secured around the leading end sections of said sheets and adapted to be coupled with a camera, said device comprising a pair of end walls and a pair of side walls cooperating to define a passage through which said sheets are movable, said passage including a relatively narrow section through which said sheets are movable in superposed relation and a relatively wide section wherein said leading end sections of said sheets are maintained in a separated condition, means within said wide section of said passage and located between said sheets for retaining said leading end sections of said sheets apart from one another and for separating said sheets during movement through said passage into a camera with which said device is coupled, said container being secured between said leading end sections of said sheets and with one of its ends in engagement with a plug secured in one of said end walls, said plug closing said one end of said container, said sheets being movable through said wide section of said passage along opposite sides of said container, and an aperture in the other of said end walls, the other end of said container extending through said aperture, said container being removable from said passage between said sheets through said aperture.

10. A photographic film unit as defined in claim 9 wherein portions of said one end wall defining said aperture cooperate with said container to cause said liquid to be distributed therefrom in an elongated mass between the sheets as said container is withdrawn through said aperture.

11. A photographic film unit comprising two sheets secured in superposition at their lateral margins and adapted to be introduced into a camera and a device secured around the leading end sections of said sheets, said device including two end walls and two side walls cooperating to define a passage through which said sheets are movable, portions of said side walls being so formed as to provide said passage with a relatively narrow section, said portions of said side walls engaging said superposed sheets for preventing the admission of light through said passage and other portions of said side walls provide a wider section within which the leading end sections of said sheets are maintained in a separated condition and through which said sheets may be advanced along separate paths, means within said wider section of said passage and located between said lateral margins of said sheets for retaining said leading end sections of said sheets apart from one another and for separating said sheets in response to introductory movement of said sheets through said passage against said means and into a camera with which said device is coupled, and means for releasably coupling said other portions of said side walls of said device to a camera so as to prevent the admission of light into said camera during introductory movement of said sheets through said passage, the last-mentioned means comprising outwardly projecting flanges on said other portions of said side walls having generally L-shaped cross sections.

12. A photographic film unit of the self-processing type comprising a photosensitive sheet, a second sheet secured in superposition with said photosensitive sheet along the lateral margins of said sheets, said sheets being adapted to be introduced into a camera through an aperture in the housing of said camera, a container located between the leading end sections of said sheets and carrying a quantity of photographic liquid capable of processing said film unit when distributed between said sheets and a device secured around said leading end sections of said sheets and adapted to be coupled with a camera, said device comprising a pair of end walls and a pair of side walls cooperating to define a passage through which said sheets are movable, said passage including a relatively narrow section at which portions of said side walls engage said superposed sheets so as to prevent the admission of light through said passage and a relatively wide section provided by other portions of said side walls wherein said leading end sections of said sheets are maintained in a separated condition, a pair of members mounted within said wide section of said passage between said lateral margins of said sheets for retaining said leading end sections of said sheets apart from one another and for separating said sheets in response to movement of said sheets through said passage against said members and into a camera with which said device is coupled, and means associated with said other portions of said side walls for releasably coupling said device with said camera so as to prevent the admission of light into said camera through the aperture in the housing of said camera through which said sheets are moved.

13. A photographic film unit comprising two sheets secured in superposition at their lateral margins and adapted to be introduced into a camera and a device secured around the leading end sections of said sheets and adapted to be coupled with a camera, said device comprising a pair of end walls and a pair of side walls cooperating to define a passage through which said sheets are movable, said passage including a relatively narrow section wherein portions of said side walls engage said sheets and through which said sheets are movable in superposition and a relatively wide section defined by other portions of said walls wherein said leading end sections of said sheets are maintained in a separated condition, and a pair of separating members mounted on said end walls and projecting between said lateral margins of said leading end sections of said sheets within said wide section of said passage, and separating members being located closely adjacent said side walls for retaining and sheets against said other portions of said walls so as to frictionally resist movement of said sheets through said passage, said other portions of said walls including means for coupling said device with a camera, the last-mentioned means including elongated flanges having generally L-shaped cross sections and being so constructed as to cooperate with said camera for spreading apart said other portions of said side walls to permit the movement of said sheets through said passage, said separating members being capable of separating said sheets from one another and guiding them along separate paths in response to introductory movement of said sheets through said passage against said members and into a camera with which said device is coupled.

14. A photographic film unit of the self-processing type comprising a photosensitive sheet, a second sheet superposed with said photosensitive sheet, said sheets being adapted to be introduced in a camera through an aperture in the housing of said camera, a quantity of photographic liquid capable of processing said film unit when distributed between said sheets and a device secured around the leading end sections of said sheets and adapted to be coupled with a camera, said device comprising a pair of end walls and a pair of side walls cooperating to define a passage through which said sheets are movable, said passage including a relatively narrow section through which said sheets are movable in superposed relation and a relatively wide section defined by portions of said side walls wherein said leading end sections of said sheets are maintained in a separated condition, and separating members located between said leading end sections within said wide section of said passage, said separating members being engaged between said sheets and retaining said sheets against said portions of said side walls so as to frictionally resist movement of said sheets through said passage, said portions of said side walls including means for coupling said device with a camera and being so constructed as to cooperate with said camera for spreading apart said portions of said side walls to permit the movement of said sheets through said passage, said end walls of said device being slit to permit the separation of said portions of said side walls, said separating members being capable of separating said sheets from one another and guiding them along separate paths during introduction of said sheets through said passage into a camera with which said device is coupled.

15. A photographic film unit of the self-processing type comprising a photosensitive sheet, a second sheet superposed with said photosensitive sheet, said sheets being adapted to be introduced into a camera through an aperture in the housing of said camera, a quantity of photographic liquid capable of processing said film unit when distributed between said sheets and a device secured around the leading end sections of said sheets and adapted to be coupled with a camera, said device comprising a pair of end walls and a pair of side walls cooperating to define a passage through which said sheets are movable, said passage including a relatively narrow section through which said sheets are movable in superposed relation and a relatively wide section defined by portions of said side walls wherein said leading end sections of said sheets are maintained in a separated condition, means located within said wide section of said passage and between said leading end sections of said sheets for retaining said sheets apart and for separating said sheets during their movement through said passage, an elongated tubular container filled with said photographic liquid and mounted transversely of said sheets between said sheets within said wide section of said passage, said container being so mounted that said sheets are movable on opposite sides thereof, said container retaining said sheets in frictional engagement with said portions of said walls so as to resist the movement of said sheets through said passage, said end walls including slits permitting the separation of said portions of said side walls when said device is coupled with a camera to permit the movement of said sheets through said passage on opposite sides of said container, and means associated with said portions of said side walls for so coupling said device with said camera as to spread apart said side walls.

16. A photographic film unit as defined in claim 15 wherein said means for coupling said device with said camera comprises a pair of undercut flanges secured to said portions of said side walls adjacent the open end of said wide section of said passage.

17. A photographic device adapted to be employed in combination with a photographic assemblage comprising a photosensitive sheet and a second sheet, said device comprising a pair of end walls and a pair of side walls cooperating to define a passage through which the sheets of a photographic assemblage are movable, a quantity of photographic liquid capable of processing said assemblage when distributed in a layer between said sheets, an elongated container in the form of a tube closed at both ends and enclosing said liquid, means for mounting said container between said end walls transversely of said passage so that said sheets may be located in said passage on opposite sides of said container, and an aperture in one of said end walls through which said container can be withdrawn in the direction of its elongation from said passage transversely thereof, said aperture being so formed as to compress successive sections of said container during withdrawal from said passage through said aperture, said container having one end providing a mouth which, when opened as sections succeeding from the other end are sequentially compressed, discharges said liquid from said container in an elongated mass extending substantially from side to side of sheets located within said passage.

18. The photographic device of claim 17 wherein said one end of said container is closed by a plug secured in one of said end walls of said device, said one end of said container being withdrawn from engagement with said plug during removal from said passage.

19. A photographic device adapted to be employed in combination with a photographic film assemblage comprising a photosensitive sheet and a second sheet, said device comprising, in combination, a pair of end walls and a pair of side walls cooperating to define a passage through which said sheets are movable, said passage including a relatively narrow section through which said sheets may be advanced in superposed relation and a relatively wide section through which said sheets may be advanced in a separated condition, a quantity of photographic liquid capable of processing a photographic film assemblage when distributed in a layer between the sheets comprising said assemblage, an elongated container in the form of a tube closed at both ends and enclosing said liquid, said container being mounted transversely of said wide section of said passage between said end walls and being so located in said passage as to permit the movement of said sheets through said passage on opposite sides of said container, and an aperture in one of said end walls permitting the withdrawal of said container in the direction of its elongation from said passage transversely thereof, said aperture being so formed as to progressively compress successive sections of said container during withdrawal from said passage, the other end of said container providing a mouth which, when opened as sections of said container from the other end are sequentially compressed, discharges said liquid from said container in an elongated mass extending substantially from side to side of sheets located within said passage.

20. A photographic film unit of the self-processing type comprising a photosensitive sheet, a second sheet superposed with said photosensitive sheet, said sheets being adapted to be introduced into a camera through an aperture in the housing of said camera, a quantity of photographic fluid capable of processing said film unit when distributed between said sheets, and a device secured around the leading end sections of said sheets and adapted to be coupled with a camera, said device comprising a pair of end walls and a pair of side walls cooperating to define a passage through which said sheets are movable, said passage including a relatively narrow section through which said sheets are movable in superposed relation and a relatively wide section wherein said leading end sections of said sheets are maintained in a separated condition, and a pair of relatively short tapered pins mounted on said end walls with their axes in alignment and their tapered ends projecting between the lateral margins of said leading end sections of said sheets located within said wide section of said passage, said tapered pins being capable of separating said sheets from one another during movement through said passage into a camera with which said device is coupled.

References Cited in the file of this patent

UNITED STATES PATENTS

| | | |
|---|---|---|
| 2,435,718 | Land | Feb. 10, 1948 |
| 2,441,912 | Streich | May 18, 1948 |
| 2,447,468 | Reyniers | Aug. 17, 1948 |
| 2,648,265 | Candela | Aug. 11, 1953 |